United States Patent [19]

Howorth et al.

[11] Patent Number: 5,736,109

[45] Date of Patent: Apr. 7, 1998

[54] INTUMESCENT SHEET MATERIAL AND PASTE WITH ORGANIC BINDER

[75] Inventors: Gary F. Howorth; John J. Rogers, both of St. Paul, Minn.; Toshiyuki Watanabe, Atsugi, Japan

[73] Assignee: Minnesota Mining and Manufacturing Company, St. Paul, Minn.

[21] Appl. No.: 497,671

[22] Filed: Jun. 30, 1995

[51] Int. Cl.$^6$ ............................ F01N 3/24; F01N 3/20
[52] U.S. Cl. ............ 422/179; 422/221; 264/279; 428/323; 428/324; 428/325; 428/331; 428/346; 428/454; 428/522
[58] Field of Search .................... 428/324, 323, 428/325, 331, 446, 454, 522; 422/177, 179, 180, 221, 222; 264/328.1, 279

[56] References Cited

U.S. PATENT DOCUMENTS

| | | | |
|---|---|---|---|
| Re. 27,747 | 9/1973 | Johnson | 165/166 |
| 3,001,571 | 9/1961 | Hatch | 154/2.6 |
| 3,441,381 | 4/1969 | Keith et al. | 23/288 |
| 3,709,706 | 1/1973 | Sowman | 106/57 |
| 3,795,524 | 3/1974 | Sowman | 106/65 |
| 3,916,057 | 10/1975 | Hatch et al. | 428/236 |
| 4,047,965 | 9/1977 | Karst et al. | 106/65 |
| 4,048,363 | 9/1977 | Langer et al. | 428/77 |
| 4,064,359 | 12/1977 | Peterson et al. | 174/107 |
| 4,087,039 | 5/1978 | Balluff | 228/173 R |
| 4,156,533 | 5/1979 | Close et al. | 277/229 |
| 4,269,807 | 5/1981 | Bailey et al. | 422/179 |
| 4,305,992 | 12/1981 | Langer et al. | 428/324 |
| 4,331,621 | 5/1982 | Brockmeyer | 264/44 |
| 4,385,135 | 5/1983 | Langer et al. | 523/179 |
| 4,495,030 | 1/1985 | Giglia | 162/145 |
| 4,521,333 | 6/1985 | Graham et al. | 252/606 |
| 4,565,727 | 1/1986 | Giglia et al. | 428/172 |
| 4,617,176 | 10/1986 | Merry | 422/179 |
| 4,698,213 | 10/1987 | Shimozi et al. | 422/179 |
| 4,863,700 | 9/1989 | Ten Eyck | 422/179 |
| 4,865,818 | 9/1989 | Merry et al. | 422/179 |
| 4,866,107 | 9/1989 | Doxsee et al. | 523/153 |
| 4,904,343 | 2/1990 | Giglia et al. | 162/145 |
| 4,929,429 | 5/1990 | Merry | 422/179 |
| 4,929,502 | 5/1990 | Giglia | 428/357 |
| 4,951,954 | 8/1990 | MacNeill | 277/230 |
| 4,999,168 | 3/1991 | Ten Eyck | 422/179 |
| 5,008,086 | 4/1991 | Merry | 422/180 |
| 5,045,385 | 9/1991 | Luckanuck | 428/220 |
| 5,126,013 | 6/1992 | Wiker et al. | 162/156 |
| 5,137,656 | 8/1992 | Conner | 252/378 R |
| 5,139,615 | 8/1992 | Conner et al. | 162/145 |
| 5,151,253 | 9/1992 | Merry et al. | 422/179 |
| 5,207,989 | 5/1993 | MacNeil | 422/179 |
| 5,242,871 | 9/1993 | Hashimoto et al. | 501/95 |
| 5,250,269 | 10/1993 | Langer | 422/179 |
| 5,254,410 | 10/1993 | Langer et al. | 428/402 |
| 5,290,522 | 3/1994 | Rogers et al. | 422/179 |
| 5,332,609 | 7/1994 | Corn | 428/77 |
| 5,384,188 | 1/1995 | Lebold et al. | 428/283 |
| 5,385,873 | 1/1995 | MacNeill | 501/95 |
| 5,523,059 | 6/1996 | Langer | 422/179 |

FOREIGN PATENT DOCUMENTS

| | | |
|---|---|---|
| 0 319 299 | 6/1989 | European Pat. Off. . |
| 639 700 A1 | 2/1995 | European Pat. Off. . |
| 639 701 A1 | 2/1995 | European Pat. Off. . |
| 639 702 A1 | 2/1995 | European Pat. Off. . |
| 2 450 796 | 10/1980 | France . |
| 2 634 479 | 1/1990 | France . |
| 3514150 | 4/1985 | Germany . |
| 1 513 808 | 6/1978 | United Kingdom . |
| 1 522 646 | 8/1978 | United Kingdom . |
| 1 604 908 | 12/1981 | United Kingdom . |
| 2 164 580 | 3/1986 | United Kingdom . |

OTHER PUBLICATIONS

JP 4194463, English Abstract Jul. 14, 1992.
JP 5164472, English Abstract, Jun. 29, 1993.
Stroom et al., "Systems Approach to Packaging Design for Automotive Catalytic Converters", Paper No. 900500, SAE Technical Paper Series, 1990.
Howitt, "Thin Wall Ceramics as Monolithic Catalyst Supports", Paper No. 800082, SAE Technical Paper Series, 1980.
Howitt et al., "Flow Effects in Monolithic Honeycomb Automotive Catalytic Converters", Paper No. 740244, SAE Technical Paper Series, 1974.
Howitt et al., "Cellular Ceramic Diesel Particulate Filter", Paper No. 810114, SAE Technical Paper Series, 1981.
JP-5245324, English Abstract Sep. 24, 1993.

Primary Examiner—Paul J. Thibodeau
Assistant Examiner—D. Lawrence Tarazano
Attorney, Agent, or Firm—Scott A. Bardell; Harold C. Knecht, III

[57] ABSTRACT

The invention provides a catalytic converter or diesel particulate filter comprising: (a) a housing; (b) a catalytic converter element or diesel particulate filter element disposed within said housing; and (c) a flexible intumescent sheet material disposed between said catalytic converter element and said housing; wherein said flexible intumescent sheet material comprises 1 to 70 dry weight percent of at least one unexpanded intumescent material, from greater than 20 to 50 dry weight percent of organic binder, 5 to less than 79 dry weight percent of inorganic binder, and 0 to 70 dry weight percent of one or more fillers.

18 Claims, 11 Drawing Sheets

INTUMESCENT SHEET MATERIAL AND PASTE WITH ORGANIC BINDER

FIELD OF THE INVENTION

The present invention relates to mounting materials for high temperature environments such as catalytic converters and diesel particulate filters.

BACKGROUND OF THE INVENTION

Pollution control devices are employed on motor vehicles to control atmospheric pollution. Two types of devices are currently in widespread use—catalytic converters and diesel particulate filters or traps. Catalytic converters contain a catalyst, which is typically coated onto a monolithic structure in the converter. The catalyst oxidizes carbon monoxide and hydrocarbons, and reduces the oxides of nitrogen in automobile exhaust gases in order to control atmospheric pollution. Diesel particulate filters or traps are wall flow filters in which the monoliths have honeycombed structures and are made from porous crystalline ceramic materials.

In the state of the art construction of these devices, each type of device has a metal housing which holds within it a monolithic structure or element which can be metal or ceramic, most commonly ceramic. The ceramic monolith generally has very thin walls to provide a large amount of surface area and is fragile and susceptible to breakage. It also has a coefficient of thermal expansion generally an order of magnitude less than the metal (usually stainless steel) housing in which it is contained. In order to avoid damage to the ceramic monolith from road shock and vibration, to compensate for the thermal expansion difference, and to prevent exhaust gases from passing between the monolith and the metal housing, ceramic mat or paste materials are typically disposed between the ceramic monolith and the metal housing. Ceramic mat materials, ceramic pastes, and intumescent sheet materials useful for mounting the monolith in the housing are described in, for example, U.S. Pat. Nos. 3,916,057 (Hatch et al.), 4,305,992 (Langer et al.), 4,385,135 (Langer et al.), and GB 1,522,646 (Wood). U.K. Patent Specification 1,513,808 describes a flexible intumescent sheet with 5 to 20 percent organic binder.

The currently available mounting materials typically include a binder, an intumescent agent, and fibers. The binders used have been inorganic, including such materials as clays, expanded or treated vermiculite, and the like. Small amounts of organic binders such as latices of styrene butadiene, rubber, acrylics, and the like have also been included with inorganic binders to improve the flexibility and resiliency of the paste or sheet material. Organic materials are typically used in amounts of less than 15% by weight because the organic materials burn out after the initial heat up of the catalytic converter or diesel filter, and it is generally believed that the burn out of the organic binders can result in voids which can lead to weakening of the mounting material and failure to hold the monolith in place. During the first heating cycle the pressure within the can typically initially decreases due to burn out of the organic binder, dehydration, and shrinkage of other binders, before the vermiculite expands. In the past, the levels of organic binder were held below about 15 percent because of concern that the mounting material would fail to hold the monolith in place during the first heating cycle.

EP 0 639 700 A1 (Stroom et al.) describes the use of an organic binder system with a mixture of glass and other fillers to provide an edge protectant material which covers at least a portion of the lateral edge of an intumescent mounting mat to protect the mat from erosion at elevated temperatures. In use, the organic binder is burned out and the glass particles than act as a high temperature inorganic binder to hold selected fillers together and provide a barrier that protects from erosion. The composition is used only as an edge protectant and is not suitable to provide primary support to the monolithic structure. While having their own utility as an edge protectant, the compositions described would not be suitable as mounting materials since they contain relatively large amount of glass. The glass does not exert holding force at low temperatures of use since the glass is a hard, brittle, solid mass below its softening point; the glass can flow at higher temperatures. The combination of glass and organic binder materials can expand sufficiently to fill the increasing gap caused by the expansion of the metal housing upon heating; however, this expansion can occur only during the first heating cycle. When the glass is then again exposed to temperatures above the glass softening point, the glass will deform to release stress and cease to provide a holding force to keep the monolith in place.

Fibers have also been used to improve the resiliency and strength and to facilitate handling of sheet materials made primarily from inorganic materials. Metal mesh materials have been used for this purpose. Refractory ceramic fibers such as those made of alumina silicates are also commonly used because they provide the high strength and resiliency needed in sheet materials. However, these materials in conventional formulations may yield unacceptable high canning forces when mount densities above 1.0 gm/cc are desired. There is also difficulty in including fine particle size or high density fillers in conventional wet laid formulae with ceramic fibers. It is undesirable to use refractory ceramic fibers having a fiber diameter of less than about five micrometers.

There exists an ongoing need for high strength materials useful for mounting fragile structures in catalytic converters and diesel particulate filters which do not use refractory ceramic fibers small diameter ceramic fibers. The present invention provides mounting materials with a level of organic binder greater than 20 percent by weight. These high levels of organic binder unexpectedly provide mounting materials with highly desirable properties. One interesting property of some embodiments of the invention is that a sheet of the mounting material may be wrapped around a monolith so that the sheet overlaps on itself. Because of the plasticity of the mounting material, an overlapped sheet can still provide a good seal. Currently available mounting mats often are too stiff to provide a good seal if the mat is overlapped on itself.

SUMMARY OF THE INVENTION

The invention provides a catalytic converter or diesel particulate filter comprising: (a) a housing; (b) a catalytic converter element or diesel particulate filter element disposed within said housing; and (c) a flexible intumescent sheet material disposed between said catalytic converter element and said housing; wherein said flexible intumescent sheet material comprises 1 to 70 dry weight percent of at least one unexpanded intumescent material, from greater than 20 to 50 dry weight percent of organic binder, 5 to less than 79 dry weight percent of inorganic binder, and 0 to 70 dry weight percent of one or more fillers.

Additional features and advantages of the invention will be set forth in the description which follows, and in part will be apparent from the description, or may be learned by practice of the invention. The objectives and other advantages of the invention will be realized and attained by the methods and articles particularly pointed out in the written description and claims hereof.

It is to be understood that both the foregoing general description and the following detailed description are exemplary and explanatory and are intended to provide further explanation of the invention as claimed.

DETAILED DESCRIPTION OF THE INVENTION

Figure 1:
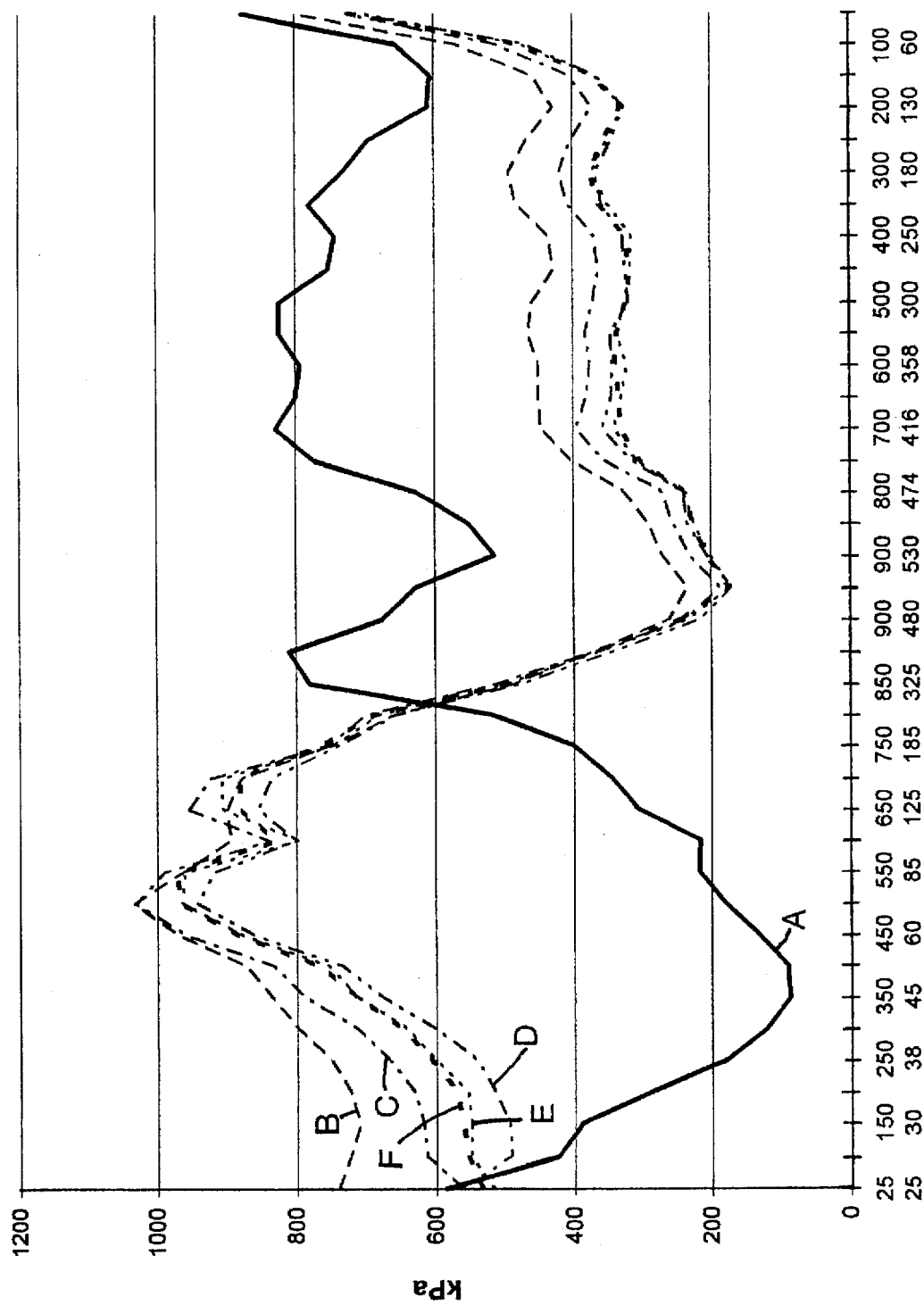
FIG. 1 is a Real Condition Fixture Test graph for Example 2.

The invention provides a mounting material for use in high temperature applications such as in catalytic converters, diesel particulate filters, and high temperature filters. In particular, the invention provides a mounting material having a high amount of organic binder, i.e., greater than 20% by weight, used to mount catalytic converter elements or diesel particulate filter elements. The mounting material comprises from greater than 20% to 50% by weight of an organic binder, 5 to less than 79% by weight of an inorganic binder, 1 to 70% by weight of an intumescent agent, and 0 to 70% by weight fillers, including fibers, particulates, etc. In a preferred embodiment the sheet material comprises less than 15 dry weight percent of glass particles. The fillers are preferably present in an amount of 5 to 30 percent by weight.

The mounting materials of the invention can be provided as a paste, a sheet, or a mat. Each of these forms have different requirements and varying compositions within the scope of the invention can be used to meet these requirements. For example, paste compositions need adequate rheological properties so that the compositions can be pumped into the gap between the monolith and the metal housing during the mounting or canning operation as well as resiliency to hold together at the temperatures of use. Sheets and mats require resiliency as well as strength, flexibility, and conformability prior to mounting since the sheets or mats are formed first, and then wrapped around the monolith. The sheets and mats need sufficient internal strength to hold together as they typically undergo further processing prior to mounting, such as die-cutting, shipping, etc. Additionally, the mats are formed by a wet-laid process, also referred to as a papermaking process, so that in forming the mats, the mat compositions, which generally contain a large amount of water, must be formulated to drain well during the forming process. Mat compositions must also be formulated to provide a suitable mount density to provide adequate pressure to hold the monolith in position. Typically, mount densities before mounting range from about 0.9 grams per cubic centimeter (g/cc) to about 1.2 g/cc. The sheets and mats can also be provided on a carrier or release liner. Useful carriers include papers such as kraft paper, polyethylene coated kraft papers, waxed paper, and the like, and films such as biaxially oriented polyester. The carriers can optionally be treated with a suitable release agent such as commercially available fluorocarbon materials, talcs, and the like.

Suitable organic binder materials include aqueous polymer emulsions, solvent-based polymer solutions, and 100% solids polymers. Aqueous polymer emulsions are organic binders polymers and elastomers in the latex form (e.g., natural rubber latices, styrene-butadiene latices, butadiene-acrylonitrile latices, and latices of acrylate and methacrylate polymers and copolymers). Solvent-based polymeric binders include, for example, a polymer such as an acrylic, a polyurethane, or a rubber-based organic polymer in an organic solvent such as toluene, methyl ethyl ketone, heptane, and mixtures thereof. The 100% solids polymers include natural rubber, styrene-butadiene rubber, and other elastomers. Acrylic materials are preferred because of their excellent aging properties, slow burn out over the temperature range used, and noncorrosive combustion products.

The binder material can include at least one of a tackifier(s), a plasticizer(s), or both. Tackifiers, or tackifying resins can be hydrocarbons or modified rosin esters, and typically provide adhesive-type properties to a polymer. Tackifiers aid in holding the binder, and fillers together. Plasticizers tend to soften a polymer matrix and thereby contribute to the flexibility and moldability of the sheet materials made from the composition. Rheology modifiers can also be included to provide the flow properties desires.

Preferably, the organic binder material includes an aqueous acrylic emulsion. Useful acrylic emulsions include those commercially available under the trade designations "RHOPLEX TR-934" (a 44.5% by weight solids aqueous acrylic emulsion) and "RHOPLEX HA-8" (a 44.5% by weight solids aqueous emulsion of acrylic copolymers) from Rohm and Haas of Philadelphia, Pa. A preferred acrylic emulsion is commercially available under the trade designation "NEOCRYL XA-2022" (a 60.5% solids aqueous dispersion of acrylic resin) from ICI Resins US of Wilmington, Mass.

Useful organic binder materials may comprise from 0 to 80 percent by weight plasticizer, 0 to 100 percent by weight tackifier, and 0 to 100 percent by weight acrylic resin. A preferred organic binder material for a sheet or mat comprises acrylic resin in the range from about 25 to about 50 percent by weight, plasticizer(s) (e.g., such as that commercially available under the trade designation "SANTICIZER 148" (isodecyl diphenyl diphosphate) from Monsanto of St. Louis, Mo.) in the range from about 15 to about 35 percent by weight, tackifier(s) (e.g., rosin tackifier such as that commercially available under the trade designation "SNOWTACK 810A" (a 50% by weight aqueous rosin dispersion; melting point of rosin: 55° C., from Eka Nobel, Inc., of Toronto, Canada) in the range from about 25 to about 50 percent by weight, based on the total weight of the resulting dispersion. These ranges provided a compromise between the desired flexibility of the binder material and minimizing the amount of organic binders which burn out during heating at the temperatures of use. For an injectable paste, the preferred organic binder comprises a larger amount of acrylic resin.

Suitable inorganic binders are known in the art for such use and include water swellable clays such as montmorillonite (present in major amounts in bentonite, hectorite, and saponite) and kaolinite; water swellable synthetic mica such as tetrasilisic fluorine mica, in either the water-swelling unexchanged form or after flocculation as the exchanged salt with a divalent or polyvalent cation; expanded and delaminated vermiculite; and ground expanded vermiculite, which can be prepared, for example, by ball-milling or high shear mixing of unexpanded or expanded vermiculite. Preferred inorganic binders include delaminated expanded vermiculite and ground expanded vermiculite. Also useful are inorganic refractory fibers such as ceramic fibers, metal fibers, and other micacious materials.

Useful fibers include those made from graphite, silica, alumina-silica, calcia-silica, asbestos, glass, metals, such as Inconel and stainless steel, and polymeric materials such as rayon and acrylic. Commercially available fibers include aluminosilicate fibers (available, for example, under the trade designations "NEXTEL 312 CERAMIC FIBERS," "NEXTEL 440 CERAMIC FIBERS," and "NEXTEL 550 CERAMIC FIBERS" from Minnesota Mining & Manufacturing Company), "FIBERFRAX 7000M" from Carborundum Company of Niagara Falls, N.Y., "CERAFIBER" from Thermal Ceramics of Augusta, Ga., and stainless steel fibers (available, for example, under the trade designation "BEKI-SHIELD GR90/C2/2" from Bekaert Steel Wire Corp. of Atlanta, Ga.). Preferred fibers include glass fibers, metal fibers, and polymeric fibers.

The composition can include up to 15% by weight of glass fibers or particles. Preferably, the glass fibers are used in amounts of less than 5% by weight such that the total glass content, i.e., the total of glass fibers and glass particles, of the composition is less than about 15%. Useful types of glasses include calcium borosilicate glasses, such as calcium aluminoborosilicate glasses, magnesium aluminoborosilicate glasses, and alkali borosilicate glasses. Preferred glasses are alkali borosilicate glasses and magnesium aluminosilicate glasses. The term "glass" as used herein refers to an amorphous (i.e., a material having a diffuse x-ray diffraction pattern without definite lines to indicate the presence of a crystalline phase) inorganic oxide material. Suitable glass fibers have a softening point near the temperature of use. This temperature is typically below about 900C., preferably below about 850C., and most preferably below about 800C. The term "softening point" refers to the temperature at which a glass in the form of a fiber of uniform diameter elongates at a specific rate under its own weight. Suitable glass fibers include commercially available under the Micro-Strand™ Micro-Fibers™ trademark from Schuller International, Inc.

Useful intumescent materials include unexpanded vermiculite, i.e., vermiculite ore, intumescent graphite, such as intercalated graphite obtained from Union Carbide Co., Inc. under the UCAR tradename, hydrobiotite, and water swellable synthetic tetrasilicic fluorine type mica described in U.S. Pat No. 3,001,571. Preferred intumescent materials include vermiculite ore, unexpanded vermiculite, and intumescent graphite. The choice of the intumescent materials can vary depending upon the desired end use. For higher temperatures, e.g., above about 500C., vermiculite materials are preferred since they start to expand at about 285C. to fill the expanding gap between the expanding metal housing and the monolith. For lower temperature use, e.g., below about 500C., such as in diesel particulate filters, intumescent graphite may be preferred since it starts to expand at about 210C.

Mounting materials of the invention in sheet form can also be reinforced to improve handling characteristics, improve elevated temperature performance, or both, by using a reinforcing sheet materials such as mesh material, e.g., a stainless steel mesh, woven or nonwoven fabrics, or metal foils. A scrim may be used to reinforce the mounting material; the scrim is preferably on the side of the sheet that is not in direct contact with the catalytic converter element. Useful scrims include nonwoven polyethylenes, nylons, polyesters, and the like.

Crushable and low density materials can also be used as fillers. The crushable fillers can be used to reduce the weight of the mounting materials as well as to reduce the compression pressure during the initial heating of the catalytic converter when the intumescent agents expand and the mounting material starts to exert pressure against the housing. The crushable fillers would collapse to prevent excessive pressure from building. Suitable crushable fillers include hollow glass bubbles, non-delaminated, expanded vermiculite, and perlite.

Other suitable fillers include inert materials that are relatively insoluble in water. Such materials include hydrated metal oxides (e.g., alumina and sodium silicate), berates (e.g., boric acid and zinc borate), calcium carbonate, talc, feldspar, silicon carbide, and silica sand.

Other additives that can be included in amount suitable for their purpose are defoaming agents, surfactants, fungicides and bactericides.

The mounting materials of the invention can further include a narrow strip of an edge protection material to reduce the erosion from impinging hot gases in a catalytic converter. Materials useful for an edge protection strip include wire mesh fabric as disclosed in U.S. Pat. No. 5,008,086 (Merry) and the glass filled strip material disclosed in EP 0 639 700 A1 (Stroom et al.), both of which are incorporated herein by reference may also be used.

If the sheet or mat mounting materials are tacky due to the organic binders, it may be desirable to dust the sheets or mats with talc or other finely divided inorganic or organic particles to reduce the tackiness.

In the practice of the invention, the binder materials, the optional intumescent agent, and the optional fibers are mixed together. Optionally, water, dispersants, tackifiers, plasticizers, and surfactants can independently be added to aid in mixing the components together and/or to adjust the viscosity of the mixture. Mixing of the ingredients can be done by any convenient means including stirring by hand or commercially available mechanical mixers such as mogul mixers and Ross mixers. The resulting viscous mixture can then be formed into the desired shape suitable for its end use. For example, the resulting mixture can be formed or extruded into a sheet or molded to a certain shape and dimension. The mixture can be molded around the monolith as described in copending application, entitled "METHODS OF MAKING A CATALYTIC CONVERTER OR DIESEL PARTICULATE FILTER", U.S. Ser. No. 08/496,945 (Attorney Docket No. 51747USA1A), incorporated herein by reference. The mixture can also be used in paste form, and can be pumped directly into the housing between the monolith and the housing, or it can be pumped into a suitable mold. Optionally, the sheet or molded form can be dried. The sheets and molded forms of the invention have been found to have excellent handling properties in both the green state, as well as in the dried state.

In alternative formulations, sufficient inorganic binders and fibers can be used to provide compositions that can be formed into mats by a wet-laid process.

In another aspect, the invention provides for a catalytic converter or a diesel particulate filter using the mounting material of the invention. A catalytic converter or diesel particulate filter generally comprises a housing, an element (s) to support the catalyst or a filtering element, and a mounting material disposed between the structure and the housing to hold the structure in place.

The metallic housing, which is also referred to as a can or a casing, can be made from suitable materials known in the art for such use. Preferably, the housing is made of stainless steel.

Suitable catalytic converter elements, also referred to a monoliths, are known in the art and include those made of metal or ceramic. The monoliths or elements are used to support the catalyst materials for the converter. A useful catalytic converter element is disclosed, for example, in U.S. Pat. No. RE 27,747 (Johnson).

Ceramic catalytic converter elements are commercially available, for example, from Corning Inc. of Corning, N.Y., and NGK Insulator Ltd. of Nagoya, Japan. For example, a honeycomb ceramic catalyst support is marketed under the trade designation "CELCOR" by Corning Inc. and "HONEYCERAM" by NGK Insulator Ltd. Metal catalytic converter elements are commercially available from Behr GmbH and Co. of Germany.

For additional details regarding catalytic monoliths see, for example, "Systems Approach to Packaging Design for Automotive Catalytic Converters," Stroom et al., Paper No. 900500, SAE Technical Paper Series, 1990; "Thin Wall Ceramics as Monolithic Catalyst Supports," Howitt, Paper 800082, SAE Technical Paper Series, 1980; and "Flow Effects in Monolithic Honeycomb Automotive Catalytic Converters," Howitt et al., Paper No. 740244, SAE Technical Paper Series, 1974.

The catalyst materials coated onto the catalytic converter elements include those known in the art (e.g., metals such as ruthenium, osmium, rhodium, iridium, nickel, palladium, and platinum, and metal oxides such as vanadium pentoxide and titanium dioxide). For further details regarding catalytic coatings see, for example, U.S. Pat. No. 3,441,381 (Keith et al.).

Conventional monolithic type diesel particulate filter elements are typically wall flow filters comprised of honeycombed, porous, crystalline ceramic (e.g., cordierite) material. Alternate cells of the honeycombed structure are typically plugged such that exhaust gas enters in one cell and is forced through the porous wall of one cell and exits the structure through another cell. The size of the diesel particulate filter element depends on the particular application needs. Useful diesel particulate filter elements are commercially available, for example, from Corning Inc. of Corning, N.Y., and NGK Insulator Ltd. of Nagoya, Japan. Useful diesel particulate filter elements are discussed in "Cellular Ceramic Diesel Particulate Filter," Howitt et al., Paper No. 810114, SAE Technical Paper Series, 1981.

In use, the mounting materials of the invention are disposed between the monolith and the housing in similar fashion for either a catalytic converter or for a diesel particulate filter. This may be done by wrapping the monolith with a sheet of the mounting material and inserting the wrapped monolith into the housing, pumping the mounting material into a housing containing the monolith, coating the mounting material around the monolith, or molding the mounting material around the monolith and inserting the composite into the housing. When the housing containing the mounted monolith is first heated, compressive forces increase as the intumescent agents expand. The state of the art mounting materials are elastic in nature and rely on the elasticity to hold the monolith in place. However, as the pressures increase within the housing, particularly where the gaps between the housing and the monolith are small, compressive forces can exceed the strength of the monolith and crush it. The mounting materials of the invention exhibit plastic deformation in the dried state and during heating, the mounting materials will exert compressive forces only up to the plastic yield point, beyond which forces do not increase against the monolith. In addition, after burn out of the organic binders, the mounting materials have been found to have excellent erosion resistance.

Objects and advantages of this invention are further illustrated by the following examples, but the particular materials and amounts thereof recited in these examples, as well as other conditions and details, should not be construed to unduly limit this invention. All parts and percentages are by weight unless stated otherwise.

TEST PROCEDURES

Hot Shake Test

The Hot Shake Test is used to evaluate a mounting material for a catalytic converter by subjecting a catalytic converter with the mounting to vibration and hot exhaust gas from a gasoline engine.

A test assembly is prepared by cutting a strip of mounting material measuring 2.54 cm wide by the length of the circumference of the monolith used for testing, and wrapping it around the middle of an oval ceramic monolith (available from Maramont, Loudon, Tenn.) which measures 14.6 cm (5.75 inches) by 8.1 cm (3 3/16 inches) by 8.9 cm (3 1/2 inches) long. The sheet and monolith are then placed in one half of a two brick clamshell design catalytic converter housing which had been cut into half to accommodate a single brick or monolith for testing. The approximate cut housing dimensions are 17.15 cm (6.75 inches) long with a 15.2 cm (6 inches) by 8.9 cm (3 1/2 inches) oval cross section with a wall thickness of 1.40 mm (0.055 inch). The two halves of the clamshell are clamped together and welded to seal the seam to form the assembly. The flanged assembly is then affixed to the tapered end of the converter and welded in place.

The catalytic converter, with the ceramic monolith mounted securely within it, is attached to a solid fixture atop a shaker table (Model TC 208 Electrodynamic Shaker Table from Unholtz-Dickie Corp., Wagford, Conn.). The converter is then attached through a flexible coupling to the exhaust system of a Ford Motor Co. 7.5 liter displacement V-8 gasoline powered internal combustion engine. The converter is tested using an inlet exhaust gas temperature of 900 C. at an engine speed of 2200 revolutions per minute with a 30.4 kg-meter load using an Eaton 8121 Eddy-current dynamometer while shaking the converter at a frequency of 100 Hz and an acceleration of 30 g from the shaker table. The converter is shaken for 100 hours or until failure and then taken apart and the mounting material examined visually. The visual inspection determines if the monolith is cracked or if the monolith has moved inside the housing.

Real Condition Fixture Test (RCFT)

The RCFT is a test used to measure the pressure exerted by the mounting material under conditions representative of actual conditions found in a catalytic converter during normal use.

Square samples measuring 44.5 by 44.5 mm are cut from the mounting material and positioned between two 50.8 mm by 50.8 mm metal platens attached to a load frame. The platens are controlled independently for heating and are heated to different temperatures to simulate the metal housing and the monolith temperatures. Simultaneously, the space or gap between the platens is increased by a value calculated from the temperature and thermal expansion coefficients of a typical catalytic converter. The temperatures of the platens and the gap change are presented in Table 1 below. The force exerted by the mounting material is measured by a Sintech ID computer controlled load frame with Extensometer (available from MTS Systems Corp., Research Triangle Park, N.C.). The test results are shown in a graph of pressure vs. temperature and gap distance.

TABLE 1

| Top Platen Temperature (°C.) | Bottom Platen Temperature (°C.) | Gap Change (mm) |
| --- | --- | --- |
| 25 | 25 | 0 |
| 50 | 25 | 0 |
| 100 | 30 | 0 |
| 150 | 33 | 0 |
| 200 | 35 | 0 |
| 250 | 38 | 0 |
| 300 | 40 | 0 |
| 350 | 45 | 0 |
| 400 | 50 | 0 |
| 450 | 60 | 0 |
| 500 | 70 | 0 |
| 550 | 85 | 0.0127 |
| 600 | 100 | 0.0254 |
| 650 | 125 | 0.0381 |
| 700 | 150 | 0.0508 |
| 750 | 185 | 0.0762 |
| 800 | 220 | 0.1016 |
| 850 | 325 | 0.1651 |
| 900 | 430 | 0.2286 |
| 900 | 480 | 0.2667 |
| 900 | 530 | 0.3048 |
| 850 | 502 | 0.2921 |
| 800 | 474 | 0.2794 |
| 750 | 445 | 0.2540 |
| 700 | 416 | 0.2286 |
| 650 | 387 | 0.2159 |
| 600 | 358 | 0.2032 |
| 550 | 329 | 0.1905 |
| 500 | 300 | 0.1778 |
| 450 | 275 | 0.1651 |
| 400 | 250 | 0.1524 |
| 350 | 210 | 0.1270 |
| 300 | 180 | 0.1016 |
| 250 | 155 | 0.0889 |
| 200 | 130 | 0.0762 |
| 150 | 95 | 0.0508 |
| 100 | 60 | 0.0254 |
| 50 | 43 | 0.0127 |
| 25 | 25 | 0 |

Compression Test

This test is an indication of how much pressure is generated by the mounting materials during canning or mounting of the monolith in the housing. Excessive pressures are undesirable since high pressures can cause damage to the monolith during the canning process.

A 5.08 cm diameter disc is cut from the mounting material and mounted between two 10.5 cm diameter movable plates on a tensile tester (MTS model 812.21 Hydraulic Load Frame with Model 442 Controller, Model 413 Control Panel, and Model 430 Digital Indicator available from MTS Systems Corp. Research Triangle Park, N.C.). The plates are closed at a speed of 2.54 mm (0.1 inch) per minute to a gap of 2.29 mm (0.09 inch). The resulting build-up of pressure is recorded on a graph of pressure vs. gap distance.

Heated Cyclic Compression Test

This test is a measure of the durability of a mounting material when it is subjected to cyclic mechanical compression at an elevated temperature.

The test is conducted in a vertical tubular oven on the above-described compression test apparatus with a 410 Digital Generator (available from MTS Systems Corp.). A 5.08 cm disc is mounted between quartz plates in the oven which are attached to the load frame outside of the oven. The disk is compressed to a fixed open gap of 3.34 mm (0.1315 inch) between the quartz plates, and the oven is then heated to 650 C. The gap is then closed to a distance of 2.96 mm (0.1165 inch) and then opened immediately to the open gap. Each cycle takes 30 seconds.

The sample is subjected to the repeated opening and closing of the gap for 1000 cycles. Each cycle consists of closing the gap and opening the gap.

The force exerted by the mounting material after every 100 cycles is reported in Newtons (N) when the gap is opened and closed. The percent retention of holding force is calculated by dividing the holding force after 1000 cycles by the initial holding force.

Flexibility Test

This test is a measure of the flexibility and resilience of a mounting material, and is an indication of whether or not the material can be used as a sheet or a mat.

The test is conducted by taking a 2.54 cm wide strip of the dried sheet or mat material and wrapping it 180 degrees around a diameter of 20 mm to see if the sheet or mat cracks. The test is passed if the mat or sheet remains intact without breaking when tested. All of the sheets and mats in the examples passed this test.

EXAMPLE 1 AND COMPARATIVE EXAMPLE C1

An intumescent mounting material composition was prepared by adding 3003 grams of #5 expanded vermiculite (W.R. Grace Co. Cambridge, Mass.), 2000 grams water, 2,896 grams of 60.5% solids acrylic latex (Neocryl™ 2022 available from Zeneca Resins, Wilmington, Mass.), and 16 grams bactericide (Busan™ 1024 available from Buckman Laboratories, Memphis, Tenn.) to a mixer Ross mixer which included both a planetary blade and a high shear dispersing blade (Model PD 4 Mixer available from Charles Ross & Son Co., Hauppauge, N.Y.). The mixer was sealed and placed under a vacuum of 15 inches of mercury (in. Hg), (50.7 kiloPascals (kPa). The material was mixed for twenty minutes with both the planetary and dispersing blade speeds set at 20 on the control panel. After bleeding air into the vacuum and opening the mixer, 6,237 grams of tabular alumina (−48+200 mesh Alumina, Alcoa, Bauxite, Ark.), and 1,944 grams of plasticizer (Sanitisizer™ 148 available from Monsanto Co., Bridgeport, N.J.) were added to the batch. The mixer was sealed, placed under a vacuum of 15 in. Hg (50.7 kPa), and the batch was mixed for an additional 20 minutes using planetary and dispersing blade speeds set at 20. After bleeding air into the vacuum and opening the mixer, 2,896 of grams tackifier (Snowtack™ 810A available from Eka Nobel Canada, Inc., Toronto, ONT) and 6,362 grams of vermiculite ore (obtained from Cometals, Inc., New York, N.Y.) were added to the batch. Again, the mixer was sealed and placed under a vacuum of 15 in. Hg (50.7 kPa). The batch was mixed for an additional 20 minutes using planetary and dispersing blade speed settings of 20. After bleeding air into the vacuum, the mixer was opened and the resulting composition was placed in a sealed 5 gallon (18.9 liter) plastic container. The composition, on a dry weight basis, was approximately 30.6% intumescent agent, 8.4% acrylic polymer, 9.4% plasticizer, 7.1% tackifier, 14.4% inorganic binder, 0.08% bactericide, and 30% filler (alumina). The acrylic polymers, plasticizers, and tackifier together are the organic binder (24.9 dry weight percent).

Sheets measuring 230 mm by 305 mm by 6.35 mm thick (9 inch by 12 inch by ¼ inch) were cut, placed on film release liner, and dried in a convection oven at 95 C. overnight. The sheets were then reduced to a thickness of 3.18 mm (⅛ inch) thickness by rolling between the fixed and movable rolls in a squeeze roll nip (Sealeze™ 25 sealer from Seal Products, Inc. Naugaruck, Conn.). The flexible sheet produced in this manner was then cut into a strip measuring 25.4 mm (1 inch) wide by 394 mm (15½ inches) long and tested in the hot shake test described above.

Comparative Example C1 was a 25.4 mm (1 inch) wide strip of a commercially acceptable mounting material INTERAM™ Automotive Mount Mat Type 100, 3100 gram/Meter² available from Minnesota Mining & Manufacturing Co., St. Paul Minn.) was mounted and tested by the same method for comparison. The flexible sheet material of the invention lasted the full 100 hours of the test. The comparative mat lasted the full 100 hours of the test. Example 1 and Comparative Example 1 were tested in the Heated Cyclic Compression Test. The test results are shown in Table 2.

TABLE 2

| | Holding Force - Newtons | | | |
| | Example 1 | | Comparative Example 1 | |
| Number of Cycles | Closed | Opened | Closed | Opened |
| --- | --- | --- | --- | --- |
| 1 | 3362 | 462 | 4151 | 1034 |
| 100 | 3300 | 150 | 4000 | 600 |
| 200 | 3230 | 120 | 3830 | 560 |
| 300 | 3140 | 110 | 3830 | 560 |
| 400 | 3190 | 110 | 3730 | 560 |
| 500 | 3190 | 110 | 3700 | 550 |
| 600 | 3170 | 100 | 3680 | 550 |
| 700 | 3120 | 100 | 3650 | 550 |
| 800 | 3020 | 100 | 3600 | 540 |
| 900 | 3070 | 100 | 3550 | 540 |
| 1000 | 3070 | 90 | 3530 | 550 |
| % Force Retention | 91 | 22 | 85 | 53 |

The data in Table 2 indicate that the mounting materials of the invention retain a significant mount of the retention force under compression.

EXAMPLE 2

An intumescent mounting composition was prepared by adding 191.6 grams of acrylic latex (Neocryl™ 2022), 191.6 grams of tackifier (Snowtack™ 810A), 0.9 grams of bactericide (Busan™ 1024), and 128.6 grams of plasticizer Sanitisizer™ 148) to a 1-gallon (3.8 liter) Sigma blade mogul mixer (Model 4 AN2 from Baker Perkins, now APV Chemical Machinery, Inc. Saginaw, Mich.) and mixing for 3 minutes. Then 198.5 grams of expanded vermiculite (#5 Expanded Vermiculite) were added and mixed for 10 minutes, followed by the addition of 412.5 grams of silica (Crystal grade, from U.S. Silica, Berkeley Springs, W. Va.) and mixing for 20 minutes. Finally, 376.3 grams vermiculite ore (Cometals, Inc.) were added and mixed for 5 minutes to produce a resilient paste mounting material. The mounting material composition, on a dry weight basis, was approximately 8.7% acrylic polymer 7.3% tackifier, 9.7% plasticizer, 0.06% bactericide, 14.9% inorganic binder, 31% filler (silica), and 28% intumescent agent. The acrylic polymer, tackifier, and plasticizer together are the organic binder (25.7 dry weight percent).

The composition was spread into a sheet 4.76 mm (³⁄₁₆ inch) thick on waxed paper and dried overnight in a convection oven at 95 C., then cut into a 44.5 mm by 44.5 mm (1¾ inch by 1¾ inch) square for testing on the Real Condition Fixture Test (RCFT) described above with a 3.3 mm starting gap. Six cycles of the test were run and test results are shown in the graph in FIG. 1.

Figure 2:
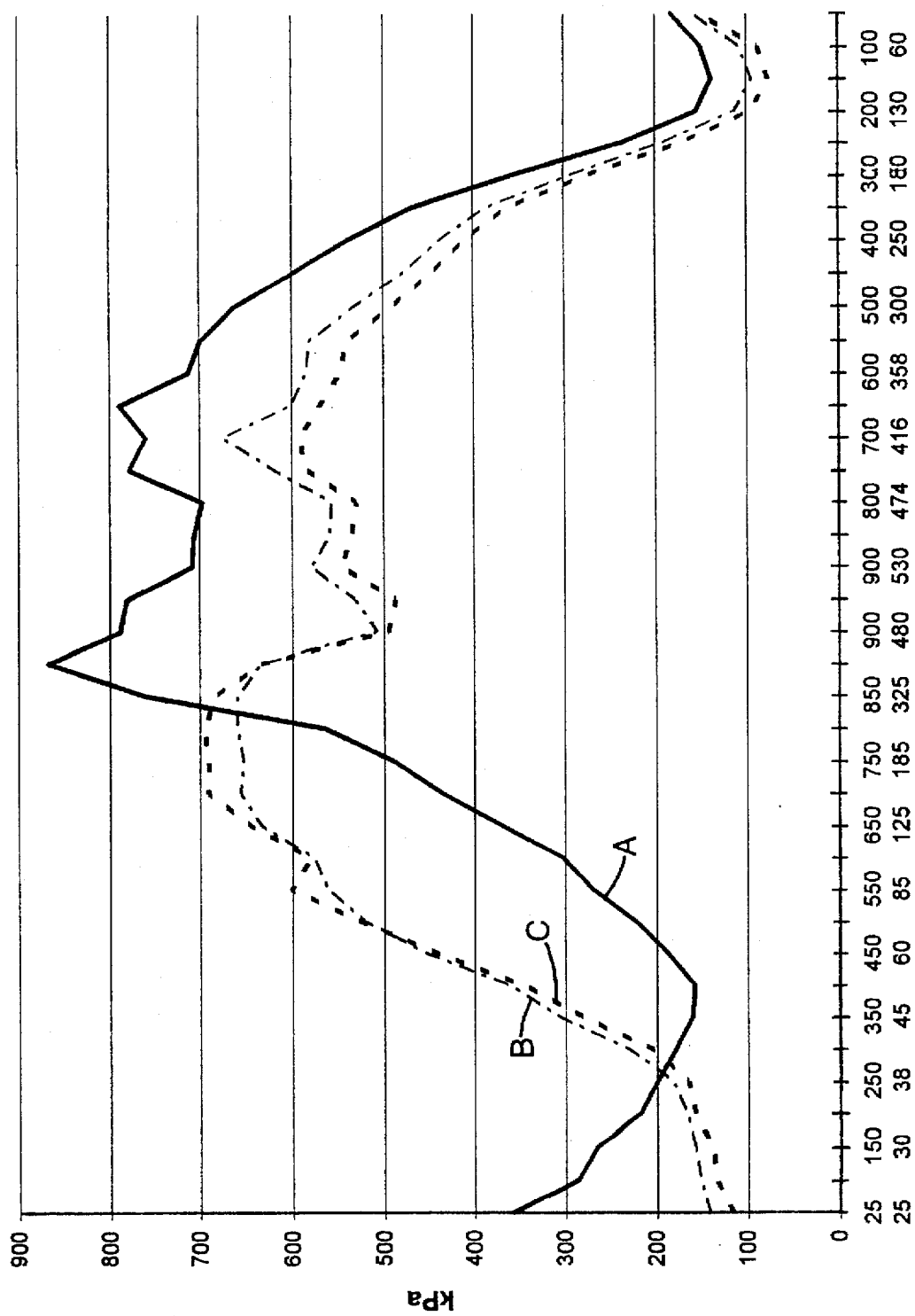
FIG. 2 is a Real Condition Fixture Test graph for Comparative Example C1.

Again, Comparative Example C1 was tested as the comparison and results are shown in the graph in FIG. 2 with a 3.1 mm starting gap. The mounting materials of the invention exhibited sufficient pressure to provide the holding force needed to keep the monolith in place over the temperature of use as compared to a commercially acceptable material.

EXAMPLE 3 AND COMPARISON EXAMPLE C2

An intumescent mounting material composition was prepared by mixing the composition of Example 1 according to the apparatus and process of Example 2. The resulting sheet material was 4.32 mm thick. The mounting material was tested according to the compression test along with Example 2, which also had a thickness of 4.32 mm and Comparison Examples C1 and C2.

Comparison Example C2 was a paste mounting material (Paste #2 available from Minnesota Mining & Manufacturing Co., St. Paul Minn.) that had been formed into a sheet having a thickness of 3.68 mm.

Figure 3:
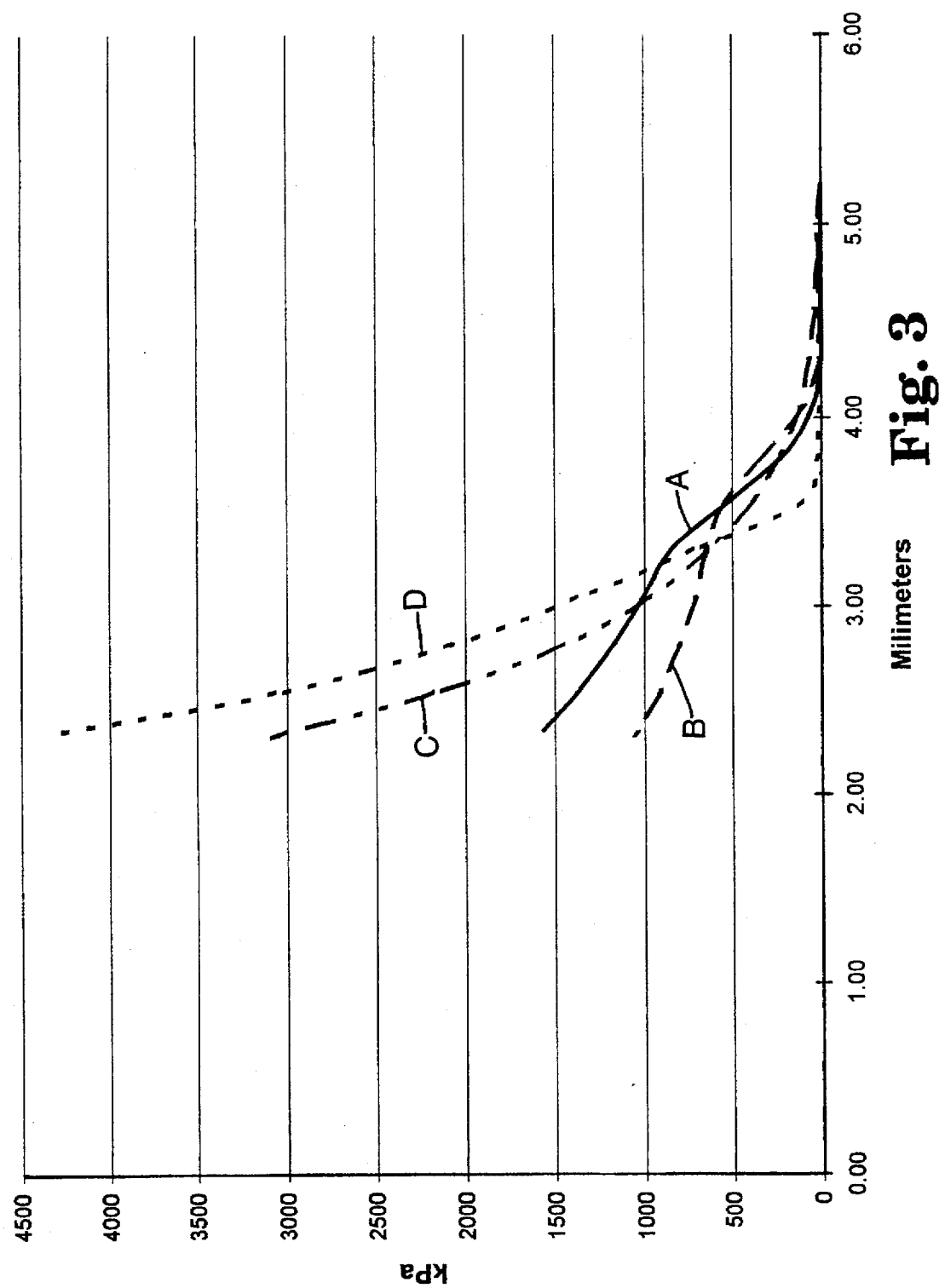
FIG. 3 presents Compression Test results for Examples 1, 2, C1, and C2.

Test results are shown in the graph in FIG. 3. The mat and paste mounting materials exhibited an exponential increase in pressure as the gap between the plates closed. The mounting materials of the invention exhibited a increase in pressure comparable to the mat material during the first 25% of compression However, the rate of increase is considerably lower than the mat and paste materials of C2. The plastic deformation exhibited by the mounting materials of the invention advantageously lowers the pressure build-up during canning.

EXAMPLE 4

An intumescent mounting material composition was prepared by adding 47 grams of alumina, 13.6 grams of bentonite clay (200 mesh clay available from Wyoming Bentonite Black Hills Bentonite Co. Casper, Wyo.), 13.6 grams of treated graphite (Product number 533-61-26 from Ucar Carbon Co. Danbury, Conn.), 53.8 grams of chopped Inconel 601 wire (Beki-Shield from Bekaert Corp. Marietta Ga.), 13.6 grams of water, 22.0 grams acrylic latex (Neocryl™ 2022), 22 grams of tackifier (Snowtack™ 810A), and 14.4 grams of plasticizer Sanitisizer™ 148) to a polyethylene beaker and mixed by hand with a metal spatula until all of ingredients were well dispersed. The composition, on a dry weight basis was approximately 28.2% filler (alumina), 8.1% clay binder, 32.2% metal fibers, 8.1% intumescent agent, 8% acrylic polymer, 6.7% tackifier, and 8.6% plasticizer. The acrylic polymer, tackifier, and plasticizer together are the organic binder (23.3 dry weight percent).

Figure 4:
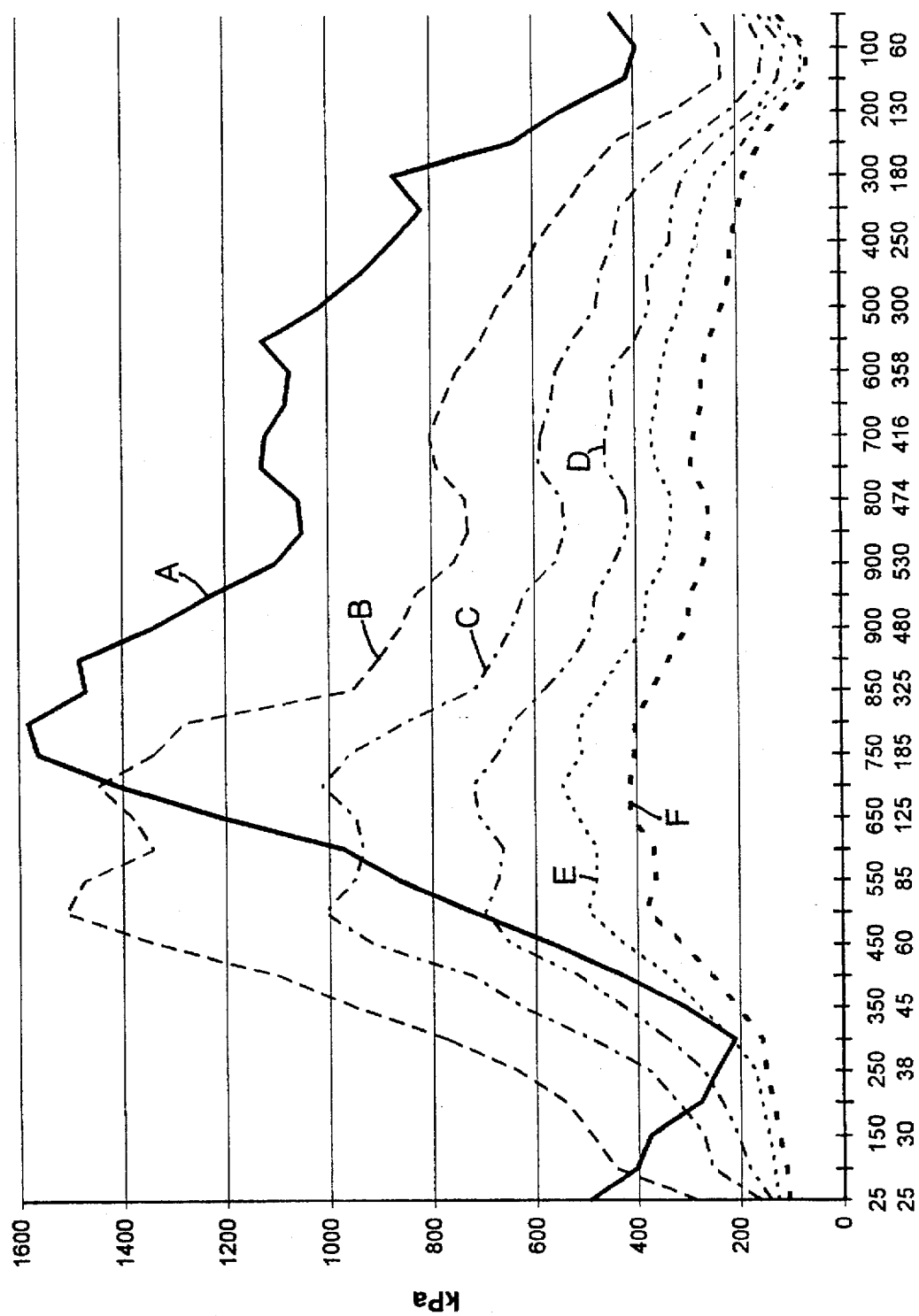
FIG. 4 is a Real Condition Fixture Test graph for Example 4.

The composition was spread to form a sheet having a thickness of 5.0 mm (³⁄₁₆) on waxed paper and dried for 72 hours in a convection oven at 95 C. Samples measuring 44.5 cm by 44.5 cm were then cut and tested in the RCFT with a 3.25 mm starting gap. Results shown in the graph of FIG. 4 indicate that the mounting material had adequate holding force over the temperature range of use.

EXAMPLE 5

An intumescent mounting material composition was prepared by adding 172.0 grams of acrylic latex, (Neocryl™ 2022), 172.0 grams of tackifier (Snowtack™ 810A), and 115.0 grams of plasticizer (Sanitisizer™ 148) to a 1-gallon mogul mixer, and then slowly adding 178.0 of grams expanded vermiculite (#5). After mixing for about 20 minutes, 93.5 grams of glass microspheres (W-1600 Z-Light Spheres Microspheres available from (Zeelan Industries, Inc. St. Paul, Minn.) were added and mixed for 5 minutes. Then 337.0 grams of vermiculite ore (Cometals, Inc.) were added and mixed for 5 minutes. The resulting mounting material had a composition on a dry weight basis of 11.4% acrylic polymer, 9.6% tackifier, 12.6% plasticizer, 19.4% inorganic binder, 36.8% intumescent material, and 10.2% glass microspheres. The acrylic polymer, tackifier, and plasticizer together are the organic binder (33.6 dry weight percent).

Figure 5:
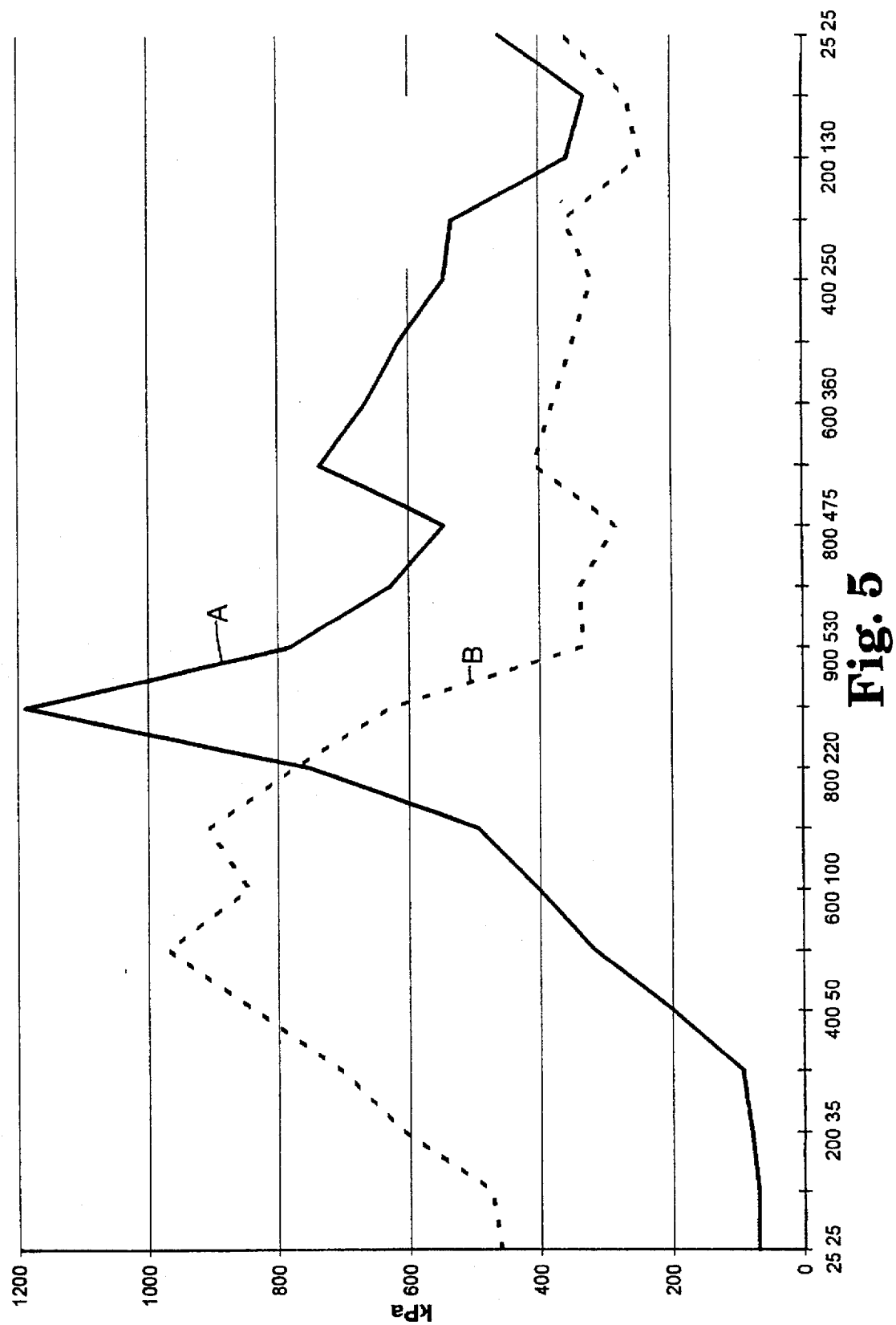
FIG. 5 is a Real Condition Fixture Test graph for Example 5.

A 5.0 mm thick sheet of material was prepared as in Example 4 and tested on the RCFT test with a 3.7 mm starting gap. Results are shown in FIG. 5.

EXAMPLE 6

Figure 6:
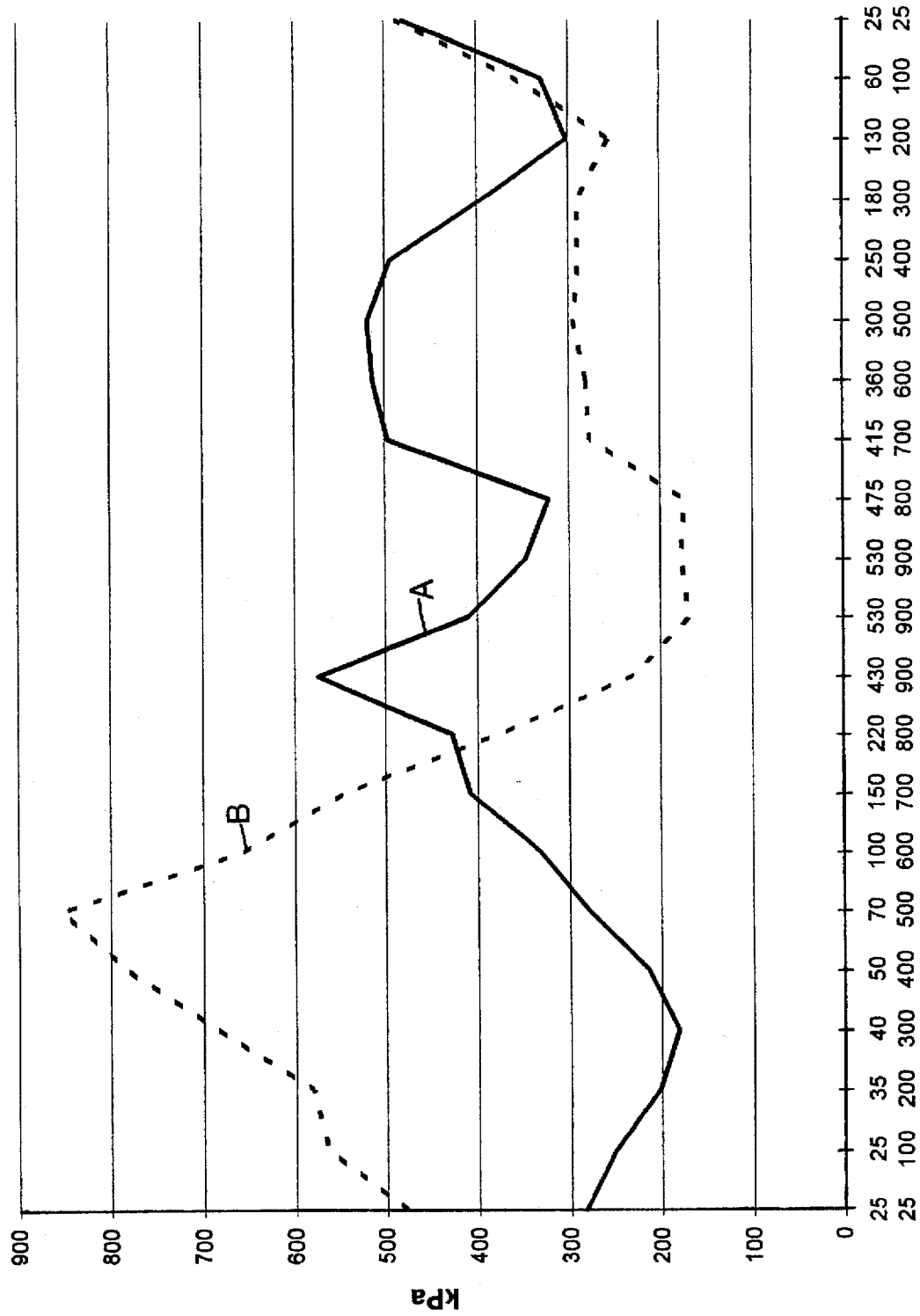
FIG. 6 is a Real Condition Fixture Test graph for Example 6.

The wet intumescent mounting composition of Example 2 was pressed into a three-dimensional wire mesh (0.11 diameter, 48 density, #12 crimp, from METEX, Edison, N.J.). The composite was dried overnight in a convection oven at 95 C., and then tested according to the RCFT with a 5.27 mm starting gap. Results are shown in the graph of FIG. 6.

EXAMPLE 7

An intumescent mat composition was prepared by adding 46 grams of ceramic fibers (7000M Alumina Silica Ceramic Fiber, available from Carborundum, Niagara Falls, N.Y.) and 2500 milliliters of water to a blender (Waring CB-6 Model 32BL39 Blender) and mixing on low speed for 20 seconds. The mixture was then poured into a cylindrical container along with an additional 1000 ml of water which was used to rinse out the blender container. The mixture was suspended by mixing with a lab stirrer at a speed setting of 4 (Yamato LaboStirrer, Model LR-41D). Then 75 grams of acrylic latex (Rhoplex™ HA-8 Acrylic Latex available from Rohm and Haas, Philadelphia, Pa.) and 1.9 grams of sodium aluminate (Nalco™ 2372 available from Nalco Chemical Co. Chicago, Ill.) were added to the mixture and mixed for one minute. Then, 16.7 grams of a 50% solids solution of aluminum sulfate ("Papermakers" Liquid Aluminum Sulfate available from American Cyanamid Co., Cloquet, Minn.) were added and mixed for one minute, followed by the addition of 77.1 grams of vermiculite ore (Cometals, Inc.). The speed of the mixer was increased to a setting of 6 for one minute. Then the mixer was turned off and the mixture was quickly poured into a 20.3 cm. by 20.3 cm. (8 inch by 8 inch) handsheet former (Williams Apparatus Co. Watertown, N.Y.) having a 40 mesh screen and drained. The formed sheet was then placed between sheets of blotter paper and pressed at a pressure of 413.7 kiloPascals (60 psi) on a pneumatic press (Mead Fluid Dynamics Chicago, Ill.). The formed mat was then dried on hot plate for 1 to 2 hours.

Figure 7:
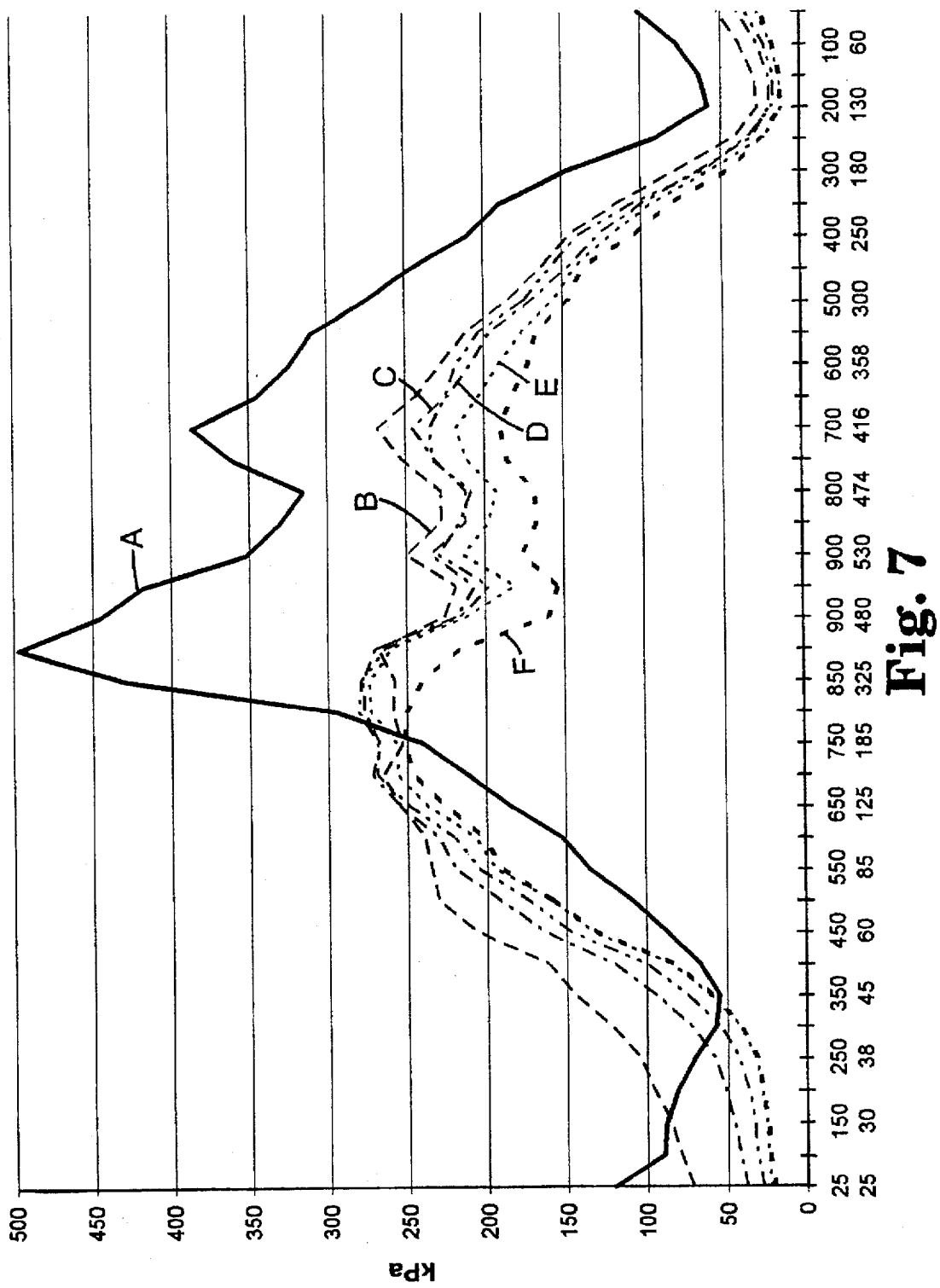
FIG. 7 is a Real Condition Fixture Test graph for Example 7.

The mat mounting material was tested according to the RCFT with a 3.8 mm starting gap and results are shown in the graph of FIG. 7.

EXAMPLE 8

Figure 8:
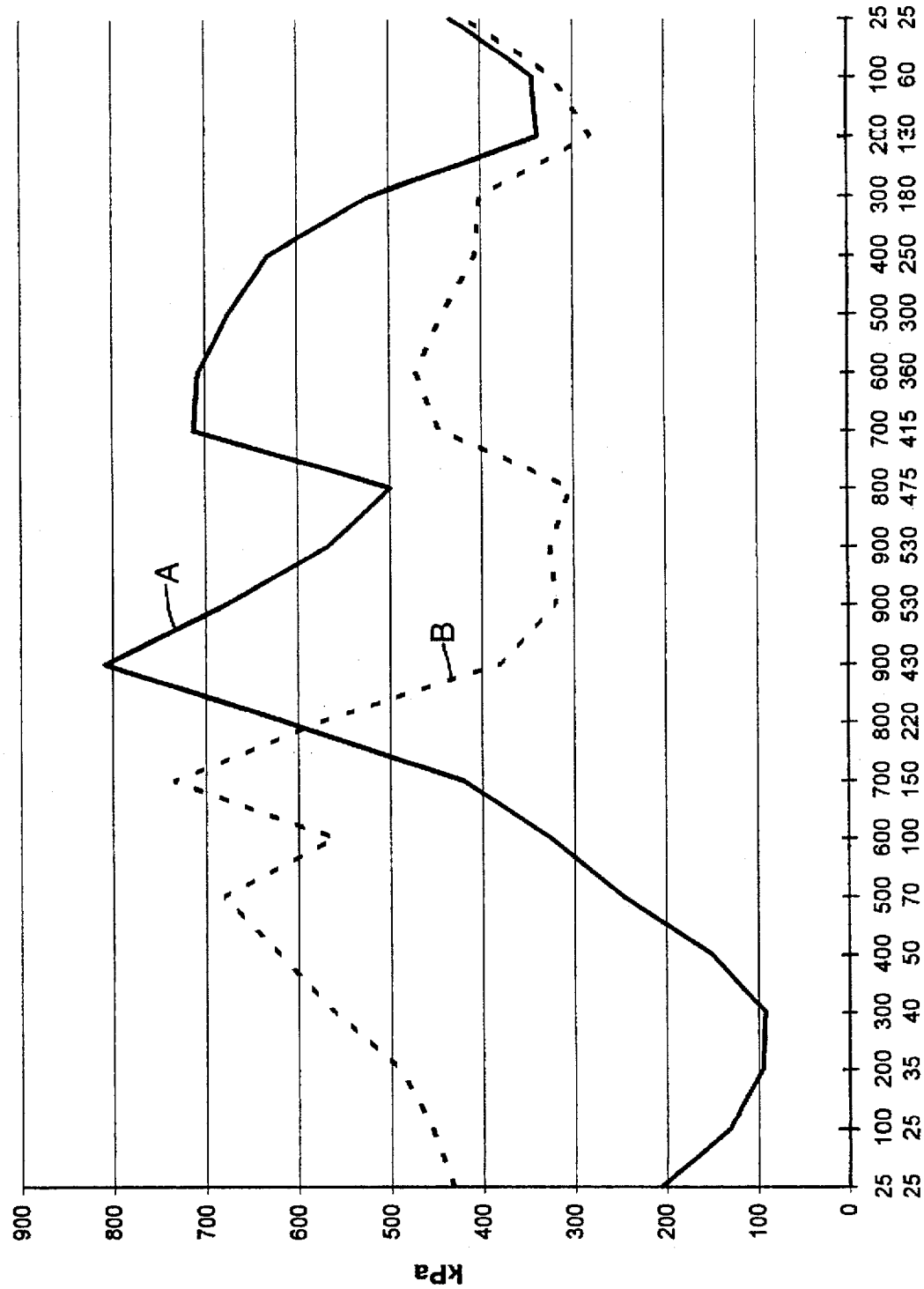
FIG. 8 is a Real Condition Fixture Test graph for Example 8.

The intumescent composition of Example 5 was pressed into a knitted metal mesh (Knitted Inconel Wire Mesh (Inconel 600 0.006 inch (0.15 mm) wire diameter, N34, 11 cpi mesh, 1.5 inch (3.8 cm) wide, available from ACS Industries, Inc., Woonsocket, R.I.) to form a mounting composite having a thickness of 6 min. A 44.5 mm by 44.5 mm square was cut from the composite sheet. Two strips of the same metal mesh, measuring 44.5 mm by 38 mm were then wrapped around two opposing edges of the square so that each overlapped the edge by about 17 mm. The composite sample, having wire mesh embedded in the mounting materials as well as wire mesh wrapped around two edges was tested according to the RCFT with a 4.78 mm starting gap. Test results are shown in the graph in FIG. 8. In addition, it was observed that the wire mesh reduced blow out and fall out of the mounting material along the wrapped edges during expansion of the sample after heating.

COMPARATIVE EXAMPLE C3

Figure 9:
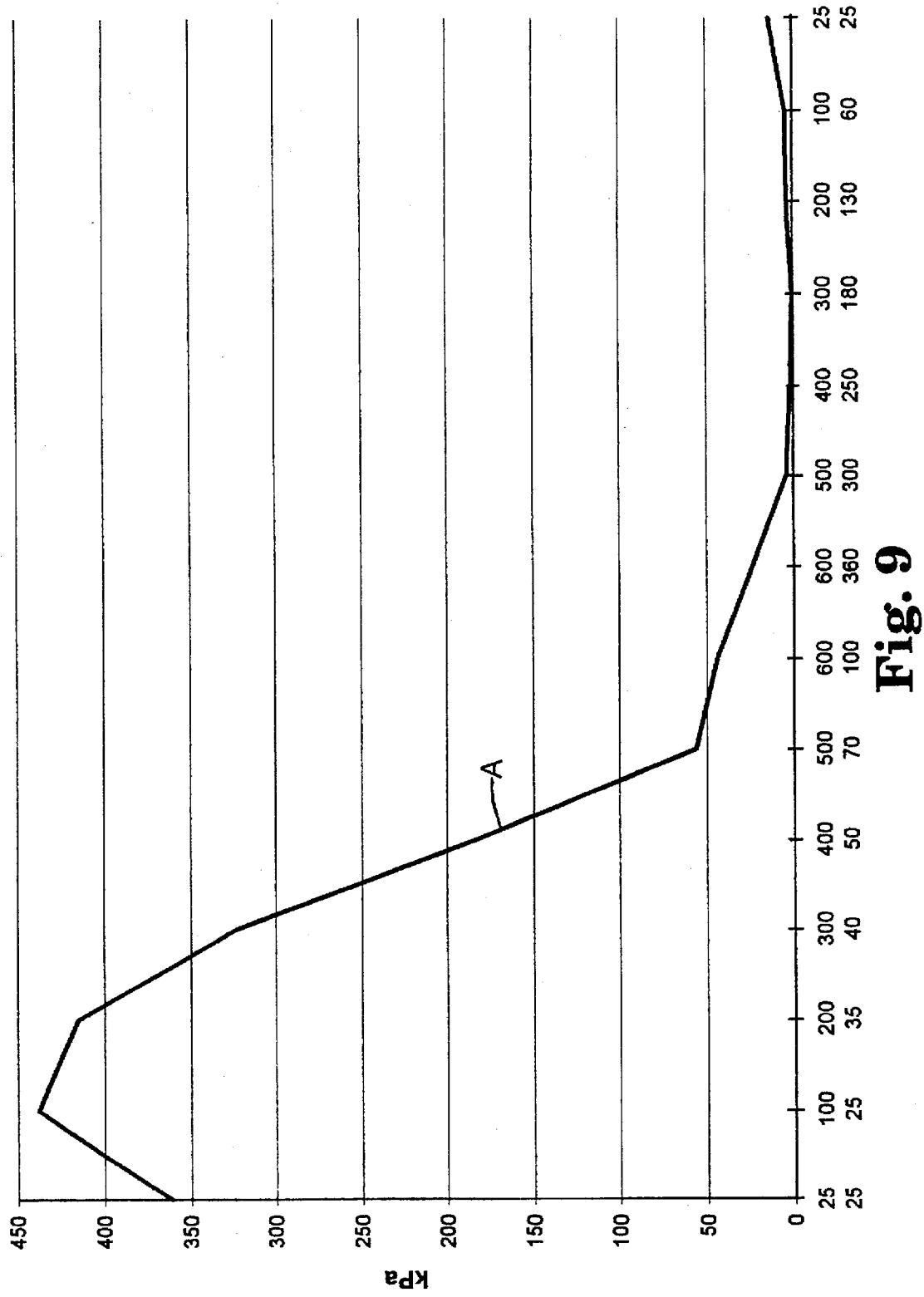
FIG. 9 is a Real Condition Fixture Test graph for Comparative Example C3.

An intumescent composition was prepared by mixing 1315.4 grams of acrylic latex and 389.7 of grams expanded vermiculite in a 1-gallon (3.8 liter) Mogul mixer for about 45 minutes. Then 294.9 grams of vermiculite ore was added and mixed about 8 minutes. The resulting paste had a composition of 53.8% organic binder, 26.3% inorganic binder, and 19.9% intumescent material. The composition was spread onto waxed paper to a thickness of 4 mm (0.16 in.) to form a sheet which was dried overnight in a convection oven at 95 C. The sheet material was tested on the Real Condition Fixture Test with a 3.61 mm starting gap. Results in FIG. 9 show that amounts of organic binders in excess of about 50% lose holding force during the cool down period of the first cycle.

COMPARATIVE EXAMPLE C4

An intumescent composition was prepared as follows. 2300 grams water, 3185.5 grams of acrylic latex (Neocryl™ 2022), 2141.8 grams of plasticizer (Santisizer™ 148), 16 grams of bacteriacide (Busan™ 1024), 2433.4 grams of ceramic fibers (7000M Ceramic Fibers, available from Carborundum, Niagara Falls, N.Y.) and 25 grams of a defoamer (Foamaster 111 defoamer, Henkel Process Chemicals, Inc., Morristown, N.J.) were mixed for 20 minutes in a Ross mixer. Then, 1094.8 grams expanded vermiculite (#5) and 65.7 grams Methocel K4M (hydropropyl methylcellulose, Dow Chemical, Midland, Mich.) were added and mixed for 10 minutes. Then, 1338.6 grams Dixie Clay (R.T. Vanderbilt Co., Inc., Norwalk, Conn.), 5475.2 grams Ceepree C200 Glass (Brunner Mond & Co., Ltd., Cheshire, UK), and 5475.2 grams tabular alumina (−48+200 mesh, alumina, Alcoa, Bauxite, Ark.) were added and mixed for 15 minutes. Then 3185.5 grams of tackifier (Snowtack™ 810A) and 25 grams of defoamer (Foamaster 111) were added and mixed for 10 minutes. After removal from the mixer, 150 grams of the mixture was placed in a 500 ml beaker and mixed by hand with 50 grams of Type "D" Vermiculite Ore. A 5 mm thick sheet was cast onto waxed paper and dried overnight in a convection oven. A 44.5 mm by 44.5 mm square was cut from the sheet and used for testing on the RCFT with a 4.1 mm starting gap. The dry weight percent of some of the components are as follows: 18.3% glass binder, 19.0% organic binder, 8.2% ceramic fiber, inorganic binder, and 3.7% micaceous inorganic binder.

Figure 10:
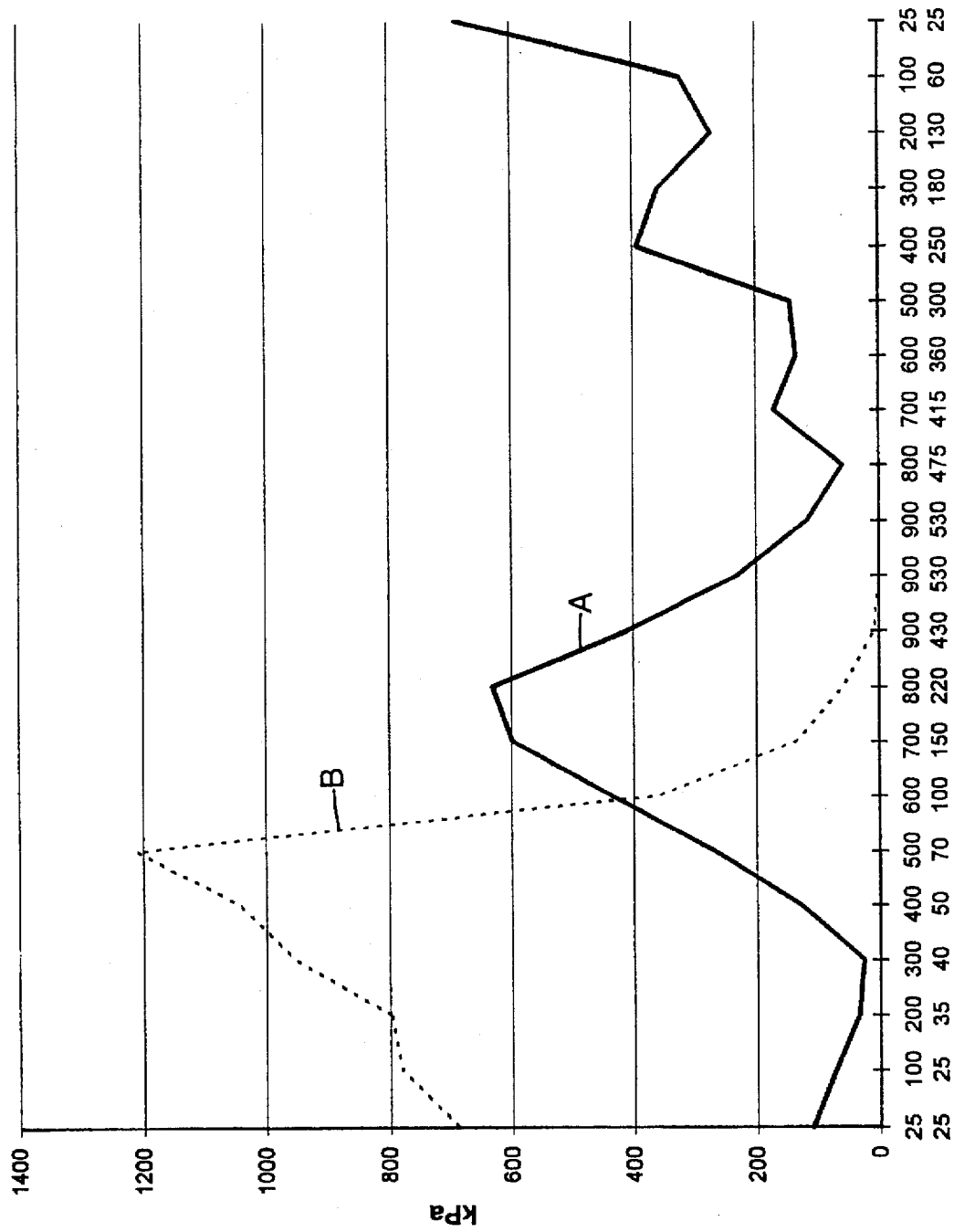
FIG. 10 is a Real Condition Fixture Test graph for Comparative Example C4.

In the first cycle holding force was maintained as the vermiculite expanded and was maintained during cooling as the gap decreased and compressed the sample. Since the glass binder is not resilient, the holding force failed (dropped to zero) at high temperature due to the glass binder's failure on the second cycle. This failure occurred even though there were significant amounts of ceramic fiber and micaceous binder also in the formula. Test results are shown in FIG. 10.

EXAMPLE 9

An intumescent composition was prepared as follows. 341.1 grams acrylic latex (Neocryl™ 2022), 191.6 grams tackifier (Snowtack™ 810A), 128.6 grams plasticizer (Santisizer™ 148), 305.5 grams ceramic fiber (7000M), 305.5 grams alumina, and 50 grams bentonite were added to a mogul mixer and mixed for 40 minutes with the ceramic fiber being added slowly during the first 5 minutes. 376.3 grams Type "D" vermiculite was then added and mixed for 10 minutes. A 5 mm thick sheet was cast on waxed paper and dried overnight in a convection oven at 95 C. A 44.5 mm by 44.5 mm sample was cut from the sheet for testing on the RCFT with a 3.2 mm starting gap.

Figure 11:
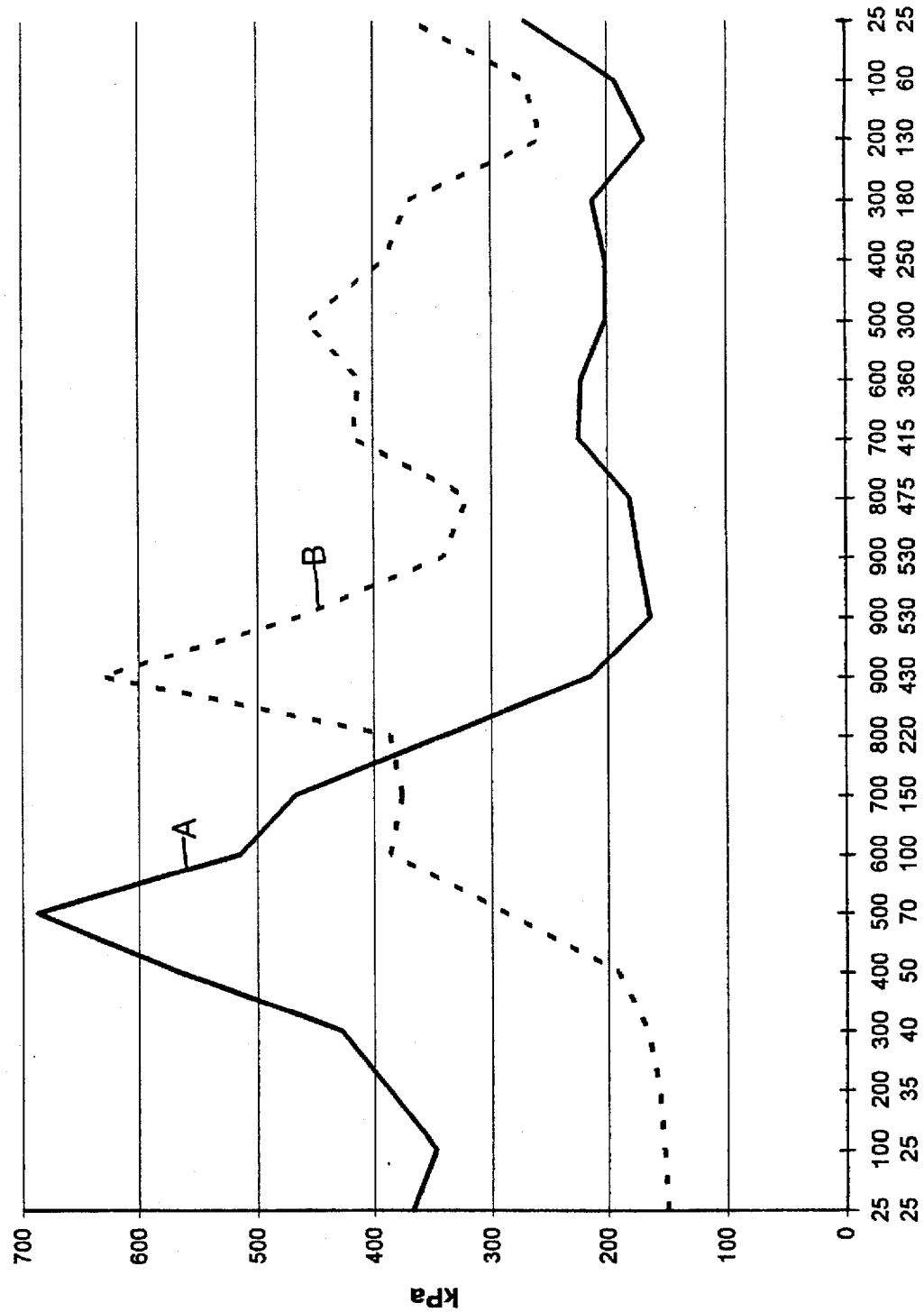
FIG. 11 is a Real Condition Fixture Test graph for Example 9.

The dry weight percent of the organic binder was 29.4% (acrylic resin 14.1%, tackifier 6.5%, plasticizer 8.8%). The dry weight percent of inorganic binder was 24.2% (ceramic fiber 20.8%, bentonite 3.4%); the dry weight percent of fillers was 20.8% (alumina). The dry weight percent of Type "D" vermiculite was 25.7%. Test results are shown in FIG. 11.

It will be apparent to those skilled in the art that various modifications and variations can be made in the method and article of the present invention without departing from the spirit or scope of the invention. Thus, it is intended that the present invention cover the modifications and variations of this invention provided they come within the scope of the appended claims and their equivalents.

What is claimed is:

1. A catalytic converter or diesel particulate filter comprising:
   (a) a housing;
   (b) a catalytic converter element or diesel particulate filter element disposed within said housing; and
   (c) a intumescent sheet material disposed between said catalytic converter element and said housing;
   wherein said intumescent sheet material comprises 1 to 70 dry weight percent of said sheet material of at least one unexpanded intumescent material, from 25 to 40 dry weight percent of said sheet material of organic binder, 5 to less than 74 dry weight percent of said sheet material of inorganic binder, and 0 to 70 dry weight percent of said sheet material one or more fillers selected from the group consisting of hollow glass bubbles, non-delaminated expanded vermiculite, perlite, calcium carbonate, talc, feldspar, silicon carbide, silica sand, and mixtures thereof.

2. The catalytic converter or diesel particulate filter of claim 1, wherein the sheet material comprises less than 15 dry weight percent of said sheet material of glass particles, glass fibers, or a mixture thereof.

3. The catalytic converter or diesel particulate filter of claim 1, wherein the sheet material comprises less than 5 dry weight percent of said sheet material of glass particles, glass fibers, or a mixture thereof.

4. The catalytic converter or diesel particulate filter of claim 1, wherein the sheet material comprises no glass particles, glass fibers, or a mixture thereof.

5. The catalytic converter or diesel particulate filter of claim 1, wherein the sheet material comprises 10 to 30 dry weight percent of said sheet material of inorganic binder.

6. The catalytic converter or diesel particulate filter of claim 1, wherein the sheet material comprises 25 to 40 dry weight percent of said sheet material of unexpanded intumescent material.

7. The catalytic converter or diesel particulate fiber of claim 1, wherein said at least one unexpanded intumescent material is unexpanded vermiculite or expandable graphite.

8. The catalytic converter or diesel particulate filter of claim 1, wherein said flowable mounting material comprises no fibers.

9. The catalytic converter or diesel particulate filter of claim 1, wherein said inorganic binder comprises inorganic fibers.

10. The catalytic converter or diesel particulate filter of claim 1, wherein said inorganic binder comprises at least one of a water swellable clay, water swellable synthetic mica, or expanded vermiculite.

11. The catalytic converter or diesel particulate filter of claim 1, wherein said organic binder comprises at least one of a tackifier or plasticizer.

12. The catalytic converter or diesel particulate filter of claim 1, wherein said organic binder comprises an acrylic binder.

13. The catalytic converter or diesel particulate filter of claim 1, wherein said organic binder comprises 25 to 50 dry weight percent of organic binder of an acrylic resin, 15 to 35 dry weight percent of said organic binder of a tackifier, and 25 to 50 dry weight percent of said organic binder of a plasticizer.

14. The catalytic converter or diesel particulate filter of claim 1, wherein said sheet material is a mat formed by a wet-laid process.

15. The catalytic converter or diesel particulate filter of claim 1, wherein said one or more fillers of said sheet material comprises alumina.

16. A catalytic converter or diesel particulate filter of claim 1, wherein said sheet material comprises a scrim.

17. A catalytic converter or diesel particulate filter comprising:
   (a) a housing;
   (b) a catalytic converter element or diesel particulate filter element disposed within said housing;
   wherein said catalytic converter element comprises a seamless continuous coating of a paste comprising 1 to 70 dry weight percent of said paste of at least one unexpanded intumescent material, from 25 to 40 dry weight percent of said paste of organic binder, 5 to less than 74 dry weight percent of said paste of inorganic binder, and 0 to 70 dry weight percent of said paste of one or more fillers selected from the group consisting of hollow glass bubbles, non-delaminated expanded vermiculite, perlite, calcium carbonate, talc, feldspar, silicon carbide, silica sand, and mixtures thereof.

18. A method of making a mounted catalytic converter element comprising:
   (a) providing a catalytic converter element; and
   (b) injecting a paste comprising 1 to 70 dry weight percent of said paste of at least one unexpanded intumescent material, from 25 to 50 dry weight percent of said paste of organic binder, 5 to less than 74 dry weight percent of said paste of inorganic binder, and 0 to 70 dry weight percent of said paste of one or fillers selected from the group consisting of hollow glass bubbles, non-delaminated expanded vermiculite, perlite, calcium carbonate, talc, feldspar, silicon carbide, silica sand, and mixtures thereof, around said catalytic converter element.

* * * * *